United States Patent
Lobo et al.

(10) Patent No.: US 9,043,428 B2
(45) Date of Patent: *May 26, 2015

(54) EDGE CACHING USING HTTP HEADERS

(71) Applicant: International Business Machines Corporation, Armonk, NY (US)

(72) Inventors: Alwyn R. Lobo, Bangalore (IN); Devaorasad K. Nadgir, Bangalore (IN); Shirish T. Shenvi Kuncolienkar, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/963,433

(22) Filed: Aug. 9, 2013

(65) Prior Publication Data
US 2014/0019577 A1    Jan. 16, 2014

Related U.S. Application Data

(63) Continuation of application No. 13/548,584, filed on Jul. 13, 2012.

(51) Int. Cl.
*G06F 13/00* (2006.01)
*G06F 15/167* (2006.01)
(Continued)

(52) U.S. Cl.
CPC ........ *H04L 67/2842* (2013.01); *H04L 67/2847* (2013.01)

(58) Field of Classification Search
CPC ......... H04L 12/00; H04L 29/00; H04L 29/06; H04L 29/08072; H04L 7/00; H04L 67/2842; H04L 67/2847; G06F 13/00; G06F 15/00; G06F 17/00; G06F 19/00; G06F 15/16; G06F 15/167; G06F 17/22; G06F 17/30; G06F 17/60; G06F 12/08
USPC ......... 709/201, 212, 213, 217–219, 248, 249, 709/203, 226, 228, 229
See application file for complete search history.

(56) References Cited

U.S. PATENT DOCUMENTS 5,699,526 A * 12/1997 Siefert .................. 705/26.8
5,787,470 A * 7/1998 DeSimone et al. ........... 711/124
(Continued)

FOREIGN PATENT DOCUMENTS

| WO | 2006081032 A2 | 8/2006 |
| WO | 2008112770 A2 | 9/2008 |
| WO | 2010029081 A1 | 3/2010 |

OTHER PUBLICATIONS

Constituencies for Users: How to Develop them by Interpreting Logs of Web Site Access, Michael J. Wright, Jan. 1999, Standford University.*

(Continued)

*Primary Examiner* — Brian J Gillis
*Assistant Examiner* — Boris Grijalva Lobos
(74) *Attorney, Agent, or Firm* — David M. Quinn; Jason H. Sosa

(57) ABSTRACT

Disclosed is a program for pre-fetching resources. A computer, communicatively coupled to a plurality of client computers and a server computer, identifies a resource, through an examination of one or more HTTP server logs, that is cached on at least one of the plurality of client computers and has been validated by the server computer. The computer determines to pre-fetch the resource based on one or more predefined rules, at least one of the predefined rules including a threshold number of responses validating the resource that must be received by the computer. The computer pre-fetches and caches the resource from the server computer. The computer receives a request for the resource from a client computer that does not have the resource cached. The computer validates resource cached locally and sends the resource to the client computer from the local cache on the computer.

8 Claims, 4 Drawing Sheets

(51) Int. Cl.
*G06F 17/30* (2006.01)
*H04L 29/08* (2006.01)

(56) References Cited

U.S. PATENT DOCUMENTS

| | | | | |
|---|---|---|---|---|
| 5,878,218 | A * | 3/1999 | Maddalozzo et al. | 709/213 |
| 5,991,306 | A * | 11/1999 | Burns et al. | 370/429 |
| 6,023,726 | A * | 2/2000 | Saksena | 709/219 |
| 6,112,231 | A * | 8/2000 | DeSimone et al. | 709/213 |
| 6,330,561 | B1 * | 12/2001 | Cohen et al. | 707/754 |
| 7,113,935 | B2 * | 9/2006 | Saxena | 707/748 |
| 7,451,225 | B1 * | 11/2008 | Todd et al. | 709/229 |
| 7,930,402 | B2 * | 4/2011 | Swildens et al. | 709/226 |
| 8,103,783 | B2 * | 1/2012 | Plamondon | 709/229 |
| 8,224,964 | B1 * | 7/2012 | Fredrickson et al. | 709/227 |
| 8,255,570 | B2 * | 8/2012 | Samuels et al. | 709/247 |
| 8,275,829 | B2 * | 9/2012 | Plamondon | 709/203 |
| 8,352,605 | B2 * | 1/2013 | Samuels et al. | 709/225 |
| 8,364,785 | B2 * | 1/2013 | Plamondon | 709/219 |
| 8,504,775 | B2 * | 8/2013 | Plamondon | 711/133 |
| 8,505,057 | B2 * | 8/2013 | Rogers | 725/87 |
| 8,615,583 | B2 * | 12/2013 | Plamondon | 709/225 |
| 2001/0051927 | A1 * | 12/2001 | London et al. | 705/51 |
| 2003/0115281 | A1 * | 6/2003 | McHenry et al. | 709/213 |
| 2005/0033926 | A1 * | 2/2005 | Dumont | 711/138 |
| 2005/0102282 | A1 * | 5/2005 | Linden | 707/3 |
| 2005/0193096 | A1 * | 9/2005 | Yu et al. | 709/219 |
| 2006/0123340 | A1 * | 6/2006 | Bailey et al. | 715/700 |
| 2006/0129533 | A1 * | 6/2006 | Purvis | 707/3 |
| 2007/0250601 | A1 * | 10/2007 | Amlekar et al. | 709/219 |
| 2008/0195819 | A1 * | 8/2008 | Dumont | 711/138 |
| 2008/0228772 | A1 * | 9/2008 | Plamondon | 707/10 |
| 2008/0320151 | A1 * | 12/2008 | McCanne et al. | 709/228 |
| 2008/0320225 | A1 * | 12/2008 | Panzer et al. | 711/130 |
| 2009/0010163 | A1 * | 1/2009 | Isomura et al. | 370/235 |
| 2009/0083279 | A1 * | 3/2009 | Hasek | 707/10 |
| 2009/0083494 | A1 * | 3/2009 | Bhanoo et al. | 711/141 |
| 2009/0094417 | A1 * | 4/2009 | Carlson et al. | 711/137 |
| 2010/0002817 | A1 * | 1/2010 | Vrcelj et al. | 375/354 |
| 2010/0063995 | A1 * | 3/2010 | Chen et al. | 709/203 |
| 2010/0271217 | A1 | 10/2010 | Kates | |
| 2010/0281217 | A1 * | 11/2010 | Sundarrajan et al. | 711/118 |
| 2011/0191449 | A1 * | 8/2011 | Swildens et al. | 709/219 |
| 2011/0205585 | A1 | 8/2011 | Mihara et al. | |
| 2011/0238828 | A1 * | 9/2011 | Grigsby et al. | 709/224 |
| 2011/0320523 | A1 * | 12/2011 | Chan et al. | 709/203 |
| 2012/0017034 | A1 * | 1/2012 | Maheshwari et al. | 711/103 |
| 2012/0042264 | A1 * | 2/2012 | Burckart et al. | 715/753 |
| 2012/0089781 | A1 * | 4/2012 | Ranade et al. | 711/118 |
| 2012/0226767 | A1 * | 9/2012 | Luna et al. | 709/216 |
| 2012/0311648 | A1 * | 12/2012 | Swildens et al. | 725/95 |
| 2013/0086197 | A1 * | 4/2013 | Ho et al. | 709/212 |
| 2013/0086323 | A1 * | 4/2013 | Kadlabalu | 711/119 |
| 2013/0173756 | A1 * | 7/2013 | Luna et al. | 709/219 |
| 2013/0198313 | A1 * | 8/2013 | Hayton et al. | 709/213 |
| 2013/0204961 | A1 * | 8/2013 | Fliam et al. | 709/214 |
| 2013/0254385 | A1 * | 9/2013 | Lyon | 709/224 |
| 2014/0019577 | A1 * | 1/2014 | Lobo et al. | 709/213 |
| 2014/0068402 | A1 * | 3/2014 | Mir et al. | 715/205 |

OTHER PUBLICATIONS

Fielding et al., "HTTP/1.1: Protocol Parameters", Part of Hypertext Transfer Protocol—HTTP/1.1, RFC 2616, section 3 [online], [retrieved on May 24, 2012]. Retrieved from the Internet <URL: http://www.w3.org/Protocols/rfc2616/rfc2616-sec3.html>.

Fielding et al., "HTTP/1.1: Caching in HTTP", Part of Hyertext Transfer Protocol—HTTP/1.1, RFC 2616, section 13 [online], [retrieved on May 24, 2012]. Retrieved from the Internet <URL: http://www.w3.org/Protocols/rfc2616/rfc2616-sec13.html>.

Fielding et al., "HTTP/1.1: Header Field Definitions", Part of Hypertext Transfer Protocol—HTTP/1/1, RFC 2616, section 14 [online], [retrieved on Jun. 29, 2012]. Retrieved from the Internet <URL: http://www.w3.org/Protocols/rfc2616/rfc2616-sec14.html>.

Hofmann et al., "Content Networking: Architecture, Protocols, and Practice", Morgan Kaufmann Publishers is an Imprint of Elsevier, San Francisco, CA, USA, Copyright 2005 by Lucent Technology and Leland R. Beaumont, ISBN: 1-55860-834-6.

Holt, "YouTube in Talks with Mobile Providers, Manufacturers Over Network Deal" scribbal.com, Jun. 8, 2011 [online], [retrieved on May 24, 2012]. Retrieved from the Internet <URL: http://www.scribbal.com/2011/06/youtube-in-talks-with-mobile-providers-manufacturers-over-network-deal/>.

Knowlton, "Edge Caching for Media Delivery" learn.iis.net, Published: Mar. 18, 2009, Updated: Feb. 9, 2011 [online], [retrieved on May 24, 2012]. Retrieved from the Internet <URL: http://learn.iis.net/page.aspx/621/edge-aching-for-media-delivery/>.

Potencier, "Caching on the Edge with Symfony2" slideshare.net, Jun. 24, 2010 [online], [retrieved on May 24, 2012]. Retrieved from the Internet <URL: http://www.slideshare,net/fabpot/caching-on-the-edge-with-symfony2>.

Wikipedia, "HTTP ETag", Published on: Feb. 17, 2011, Wikipedia, the free encyclopedia [online], [retrieved on Dec. 9, 2011]. Retrieved from the Internet <URL:http://en.wikipedia.org/w/index.php?title=HTTP_ETag&oldid=414457380>.

Yin et al., "Engineering Web Cache Consistency" ACM Transactions on Internet Technology, vol. 2, No. 3, Aug. 2002, pp. 224-259 [online], [retrieved on May 24, 2012]. Retrieved from the Internet <URL:http://www.cs.utexas.edu/~lorenzo/papers/toit.pdf>.

U.S. Appl. No. 13/548,584 entitled "Intelligent Edge Caching" filed Jul. 13, 2012.

* cited by examiner

EDGE CACHING USING HTTP HEADERS

CROSS REFERENCE TO RELATED APPLICATION

This application is a continuation of U.S. patent application Ser. No. 13/548,584 filed Jul. 13, 2012 the entire content and disclosure of which is incorporated herein by reference.

FIELD OF THE INVENTION

The present invention relates generally to the field of data transfer over a computer network, and more particularly to a technique for cache pre-fetching.

BACKGROUND OF THE INVENTION

The Hypertext Transfer Protocol (HTTP) is an application protocol for distributed information systems and is the foundation of data communication for the World Wide Web. Caching HTTP objects (html files, video, audio, images, etc.) is a well known technique to improve performance of applications requesting the objects. The HTTP/1.1 protocol (and later) includes a number of elements intended to make caching work efficiently. The goal of caching is to reduce, wherever possible, the need to send requests, and when a request must be sent, to reduce the need to send full responses in reply. Reducing the need to send requests lowers the number of network round-trips required, and is typically accomplished through "expiration" mechanisms allowing the requesting application or computer to assume that a cached copy of a resource is current if within a specified validity period. Reducing the need to send full responses lowers the strain on network bandwidth, and is typically accomplished through "validation" mechanisms. When a cache has a stale entry that it would like to use as a response to an application's or client's request, it first has to check with the origin server (or possibly an intermediate cache with a fresh response) to see if the cached (stale) entry is still usable. This is known as "validating" the cache entry. Known methods of validation include the use of "last-modified dates" and "entity tag" (ETag) values included in HTTP headers.

Intermediate "caching" servers that can store resources locally so that subsequent requests for the resource can be returned directly from the intermediate server often have the capability to pre-fetch a resource in anticipation of the resource being requested by a client computer.

SUMMARY

Embodiments of the present invention disclose a method, computer program product, and computer system for pre-fetching content for an intermediate cache. A computer, communicatively coupled to a plurality of client computers and a server computer, identifies at least one resource, through an examination of one or more HTTP server logs, that is cached on at least one of the plurality of client computers and has been validated by the server computer. The computer determines to pre-fetch the at least one resource based on one or more predefined rules, at least one of the predefined rules including a threshold number of responses validating the at least one resource that must be received by the computer. The computer pre-fetches the at least one resource from the server computer. The computer caches the at least one resource locally. The computer receives a request for the at least one resource from a client computer, of the plurality of client computers, that does not have the at least one resource cached on the client computer. The computer validates the at least one resource cached locally, and sends the at least one resource to the client computer from the local cache on the computer.

DETAILED DESCRIPTION

Figure 1:
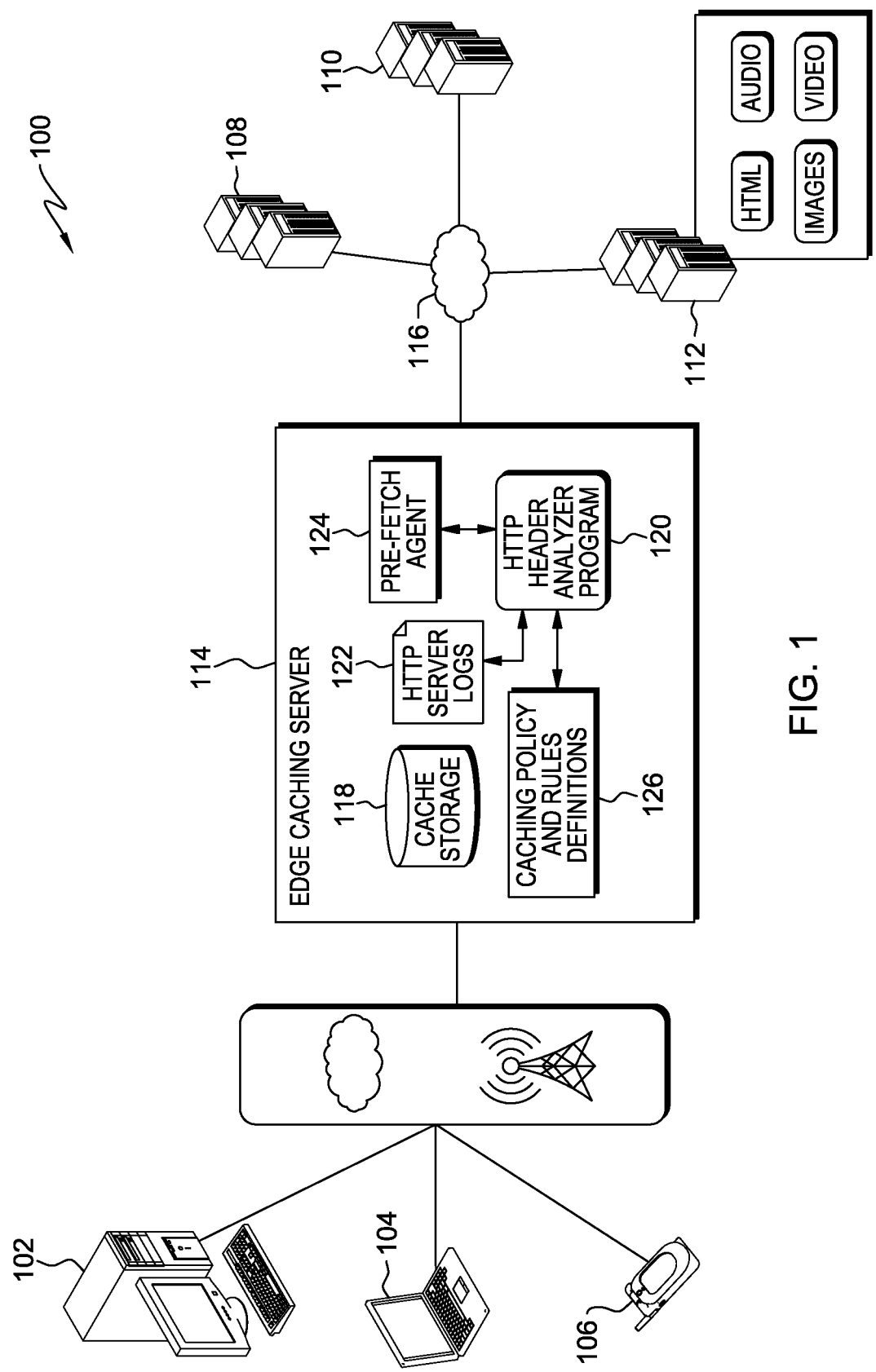
FIG. 1 is a block diagram of a distributed data processing environment comprising multiple client computers connected to multiple server computers through a network with at least one edge caching server, in accordance with an embodiment of the present invention.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device. A computer-readable tangible storage device, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The terms "Java" and "Smalltalk" may be subject to trademark rights in various jurisdictions throughout the world and are used here only in reference to the products or services properly denominated by the marks to the extent that such trademark rights may exist.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures. FIG. 1 illustrates a distributed data processing environment, generally designated 100, according to one embodiment of the present invention.

In the illustrated embodiment, distributed data processing environment 100 depicts an exemplary networked environment where various client devices (client computers 102, 104 and 106) can access content from one or more content providers (server computers 108, 110, and 112) through a series of networked connections. Requests from any of client computers 102, 104, and 106 are relayed through any number of intermediate computers, including edge caching server 114, which, in one embodiment, provides forwarding of the requests (via network 116) to the appropriate server computer through DNS mapping. The initial connection to edge caching server 114 can be provided through a standard network of wired and/or wireless components or, in another embodiment, through cellular transmission towers, as is common when a client device is a smart phone. In a scenario where the client devices communicate initially through a cellular tower, edge caching server 114 may be the nearest server computer to a radio network controller (RNC) handling transmissions from multiple towers.

Edge caching refers to the use of caching servers (intermediate or proxy computers) to store resources/content closer to end users. For example, if a client computer (an end user) accesses an origin server (e.g., a content server computer hosting a web site and/or providing other content) and downloads some static content that gets cached, each subsequent user (being routed through the caching server) will get served the content directly from the caching server until the content expires. The effectiveness of a caching server depends on the amount of data or content that can be served from its cache, achieved by a high rate of "cache hits."

Edge caching server 114 may be any programmable electronic device capable of caching content and of routing content between any of the client computers 102, 104, or 106 and any of the server computers 108, 110, or 112. In one embodiment, edge caching server 114 represents a computing system utilizing clustered computers and components to act as a single pool of seamless resources when accessed through a network.

Various techniques exist for determining what to cache and what not to cache. As a preliminary matter, caching servers typically store all allowable resources (e.g., resources where a cache-control directive in the HTTP header is "public"). Caching servers may also "pre-fetch" resources by requesting and receiving content before the content is requested by a client computer. Pre-fetching can be done based on an analysis of HTTP server logs, popularity of the content in content delivery networks (CDNs) or the Internet. Just as cache-control directives in an HTTP header can indicate that content may be cached, such directives can also indicate that content may not be cached. For example, while a "public" cache-control directive indicates that the response may be cached/stored by any cache, a "private" cache-control directive indicates that all or part of the response message is intended for a single user and must not be cached by a shared cache. This allows an origin server to state that the specified parts of the response are intended for only one user and are not a valid response for requests by other users. A private or non-shared cache (e.g., the client computer's cache) may cache the response. A "no-cache" cache-control directive allows caching by all computers, but forces caches (both of proxy computers and browsers/clients) to submit a request for validation before releasing a cached copy. HTTP provides a number of additional cache-control directive headers.

Embodiments of the present invention recognize that, especially in instances where a communication channel of a client computer has limited bandwidth (e.g., a smart phone or computer connecting to the Internet through a cellular tower connected to the core network using a radio link), HTTP directives that prevent caching can greatly impact performance of the network—especially when applications request high volumes of data (e.g., video streaming, etc.) Often content providers want to prevent network/edge caching to increase page hits at the origin server, which in turn increases advertising revenue. In an exemplary operation, client computer 106, depicted in FIG. 1 as a smart phone, makes an HTTP GET request for content such as one or more of html files, audio, images, or video from server computer 112. The request is routed through edge caching server 114. Server computer 112 returns the content with the HTTP header "Cache-control: private," directing edge caching server 114 to not store the content in its local cache, cache storage 118. Edge caching server 114 forwards the content to client computer 106. Client computer 106, as a private end-user computer, may store the content locally. If client computer 106 sends a subsequent conditional request with an "if-modified-since" or other validation header, the subsequent request cannot be validated by edge caching server 114 and the request is routed all the way back to server computer 112, which may respond with either an updated copy of the content or a "not-modified" HTTP header, confirming the freshness of the content stored in the local cache of client computer 106. Any time a different client computer, e.g., client computer 102 or 104, requests the content, because the content was not cached at edge caching server 114, or any other intermediate server, the content must be retrieved from server computer 112.

HTTP header analyzer program 120, residing on edge caching computer 114, stores, or has access to, HTTP server logs 122 that track HTTP headers received from both client computer 106 and server computer 112. In normal operation, any analysis of HTTP logs focuses on new requests and requests where any cached responses may be used (e.g., HTTP message type 200 response objects) for caching and pre-fetching. Embodiments of the present invention, additionally or alternatively, use HTTP header analyzer program 120 to track validation requests and/or validation responses to determine content that should be pre-fetched and cached. A validation request is any conditional request asking for a fresh copy of stored content if the content has been modified since it was originally cached. Typically, a conditional request contains an "if-modified-since" header. A validation response indicates that the content has not been modified and, typically, such a response contains an HTTP message type 304 "not-modified" response header. Analyzing validation requests/responses can be especially useful because consistent validation requests may be a strong indicator that content will be popular, and numerous "not-modified" responses indicate that the content tends to remain static, making it a good candidate for caching as the potential for the content to change is low.

Based, in part, on the validation requests/responses, HTTP header analyzer program 120 determines which content should be pre-fetched. In embodiments of the present invention, depending on the determined content, HTTP header analyzer program 120 may also have to set rules to allow caching where HTTP header directives seek to prevent it. HTTP header analyzer program 120 uses pre-fetch agent 124 to collect the determined resources. HTTP header analyzer program 120 may use stored caching policy and rules definitions 126 in conjunction with tracked validation requests/responses to determine the content to pre-fetch, and additionally may use stored caching policy and rules definitions 126 to store its own determined caching policies.

Figure 2:
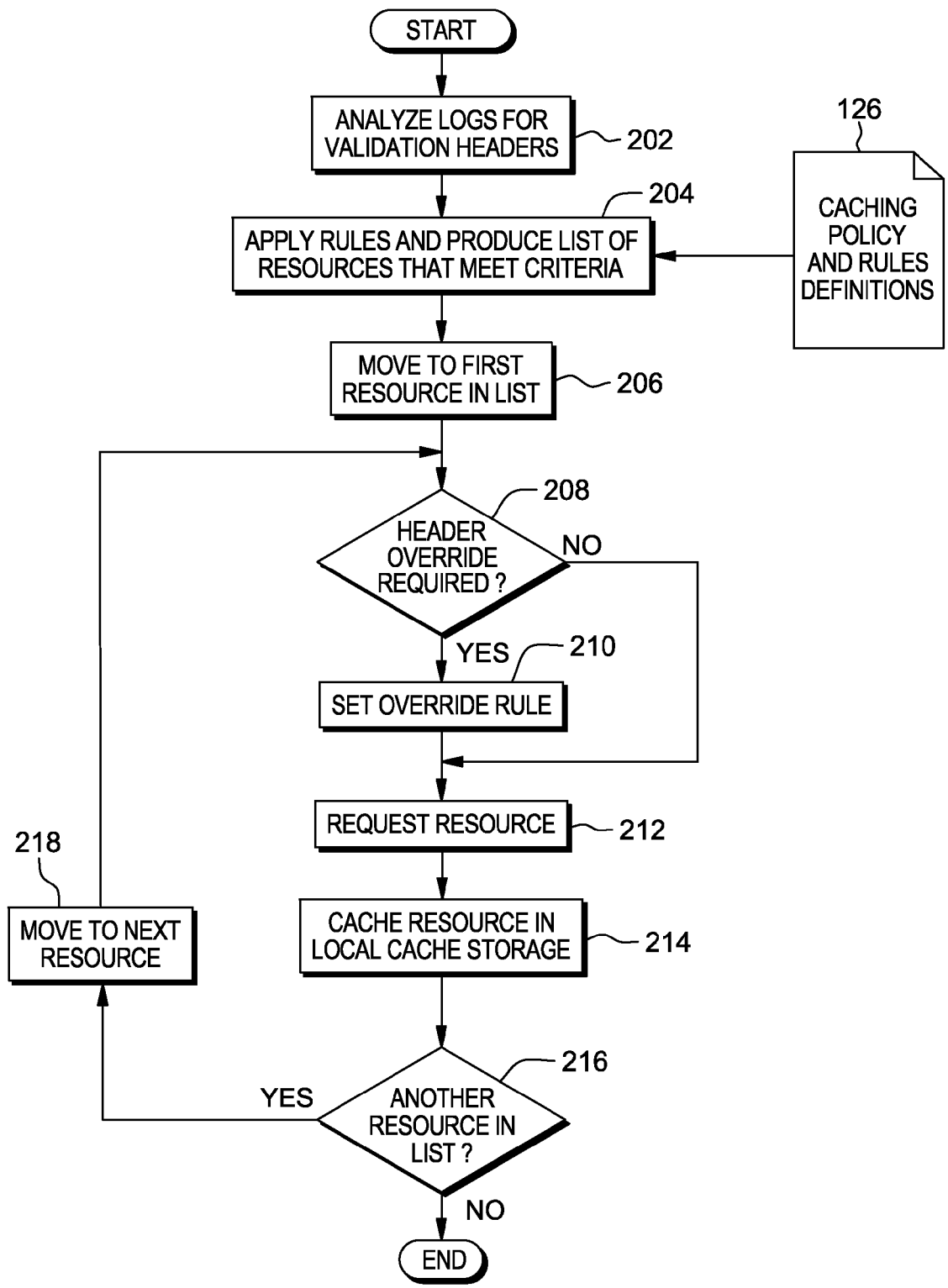
FIG. 2 is a flowchart of the steps of an HTTP header analyzer program on edge caching server within the data processing environment of FIG. 1, in accordance with an embodiment of the present invention.

FIG. 2 depicts the operational steps of HTTP header analyzer program 120 for determining resources to pre-fetch, in accordance with one embodiment of the present invention.

HTTP header analyzer program 120 analyzes HTTP server logs 122 to determine content most commonly seeking validation (step 202). HTTP server logs 122 can, in one embodiment, be HTTP header logs tracking headers of all HTTP requests and responses, and HTTP header analyzer program 120 can search the headers to identify conditional requests for content (e.g., "if-modified-since" requests) and "not-modified" responses. In another embodiment, HTTP server logs 122 are separately created logs in which edge caching server 114 can separately store conditional requests for content and "not-modified" responses, thereby avoiding the necessity to parse out the validation requests/responses. Additionally, in a hierarchical caching network, the peer caching servers (server computers at the same level of the hierarchy) can exchange information. Thus, edge caching server 114 can, in one embodiment, gather and analyze HTTP server logs from all peer caching servers to obtain the most accurate information for determining which content to pre-fetch. If a new edge caching server is installed, it can similarly query its peer caching servers for their HTTP logs to pre-populate (through pre-fetching) the empty cache of the new edge caching server. This can be referred to as "warming up" the cache.

After determining the pertinent content, HTTP header analyzer program 120 applies predefined caching policy and rules definitions 126 to produce a list of resources to be pre-fetched (step 204). One exemplary rule might state that any resource where validation has been requested more than a specified number of times, within a specified time period, and having a size greater than a specified threshold should be pre-fetched. Other exemplary rules might require that validation requests have been received from at least a specified number of client computers or that a predefined threshold of "not-modified" responses have been returned from the origin server computer. Such rules may indicate that the exact same content is being returned to multiple client computers and thus the prevention of caching is inefficient. Other rules might also limit the included resources to a top percentage of the resources meeting the criteria.

HTTP header analyzer program 120 moves to the first resource in the list (step 206) and determines whether a header override will be required (decision 208). For example, if responses to requests for the resource are received with "public" or "no-cache" headers, no special treatment will be required during a subsequent request for the resource. These are cacheable responses. However, responses having "private" headers indicate that the requested content should not be stored in edge caching server 114 and caching the response would require an override of the caching policy.

If a header override is required, HTTP header analyzer program 120 sets an override rule (step 210). The override rule indicates that a response to a given request may be cached. In one embodiment HTTP header analyzer program 120 sets an internal flag associated with the request for the resource to indicate that the resource is cacheable.

HTTP header analyzer program 120 requests the resource (step 212) and caches the resource in local cache storage (step 214). If a header of the received resource indicates that the content is not cacheable, HTTP header analyzer program 120 checks a request of the received resource and compares the request to any flagged requests to verify that the resource may be cached. A person of ordinary skill in the art will recognize that determining if a header override is required and setting the override rule may be implemented after the resource is received and before the resource is cached. Pre-fetch agent 124 may perform the actual process of forwarding the request to server computer 112 and receiving the response.

HTTP header analyzer program 120 determines whether there are more resources in the list (decision 216), and if so, moves to the next resource on the list (step 218) to perform the same process.

Subsequent requests for a pre-fetched resource can now be handled by edge caching server 114 according to standard operation protocols allowing the cached resource to be served to the requesting client computer directly from edge caching server 114. However, in a preferred embodiment, where a requested resource is cached on edge caching server 114 by virtue of a rule or policy overriding an HTTP caching directive, edge caching server 114 validates the cached resource prior to sending it to the client computer. In such a manner, the server computer may continue to get "page hits." An exemplary process flow is illustrated in FIG. 3.

Figure 3:
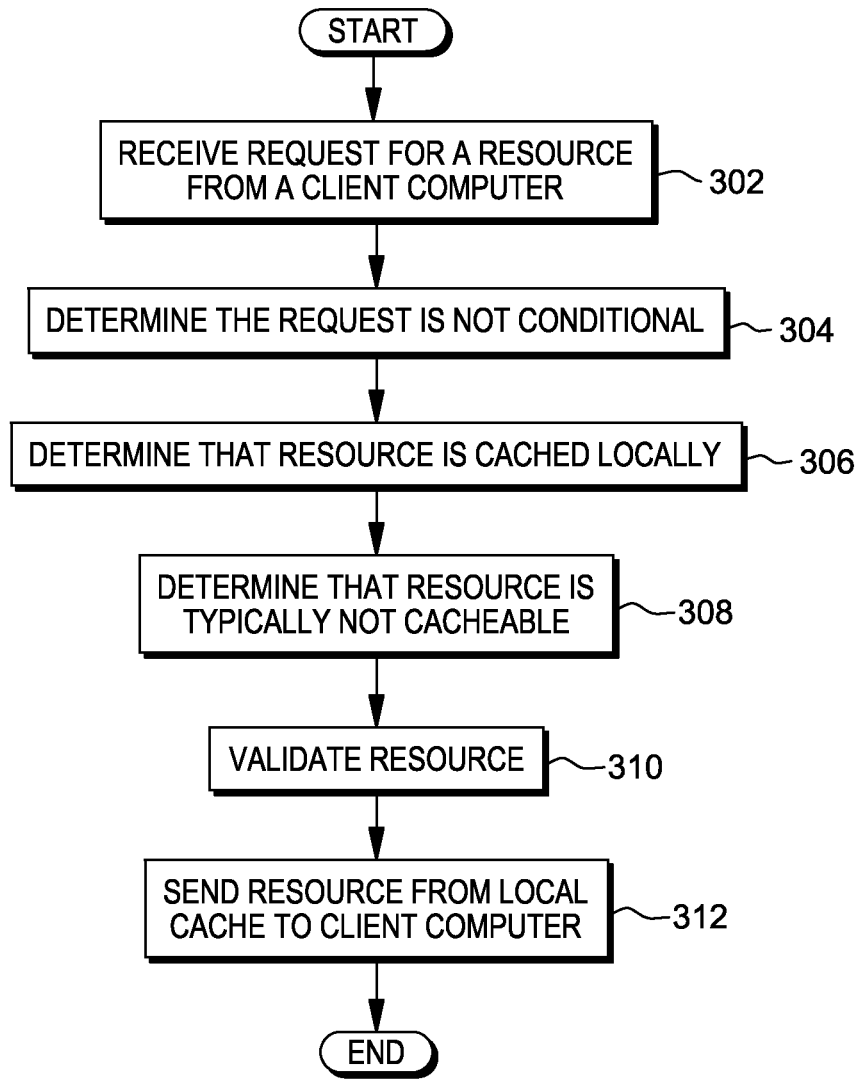
FIG. 3 depicts an exemplary process flow for validating a resource where an HTTP caching directive has been overwritten.

In FIG. 3, edge caching server 114 receives a request for a resource from a client computer (step 302). If the request received is a conditional request, this indicates that the requesting client computer has its own cached copy and wants to validate the cached copy or receive a current copy of the resource. Normal operation relays the conditional request to server computer 112 and relays the response from server computer 112 back to the requesting client computer. No deviation from standard protocols is necessary. If the request is not conditional (the requesting computer must receive the resource) and the resources is not cached locally on edge server computer 114, again, the request is relayed to server computer 112 and the resource is in turn relayed back the requesting client computer. No deviation from standard protocol is necessary. If the request is not conditional, and the resource is cached locally on edge caching server 114, but the resource is cacheable without any special overriding policies or rules, edge caching server 114 treats the request and cached resource normally and can send the resource directly to the requesting client computer or validate the resource according to standard HTTP protocols. However, if edge server computer 114 determines that the request is not conditional (step 304), and edge server computer 114 determines that the resource is cached locally (step 306), and edge server computer 114 determines that resource is not typically cacheable on edge server computer 114 (step 308), edge server computer 114 validates the resource (step 310) with server computer 112. This ensures that server computer 112 remains aware of all requests for resources not typically cacheable on edge server computer 114. Subsequent to validating the resource, edge server computer 114 sends the resource from the local cache to the requesting client computer (step 312).

Figure 4:
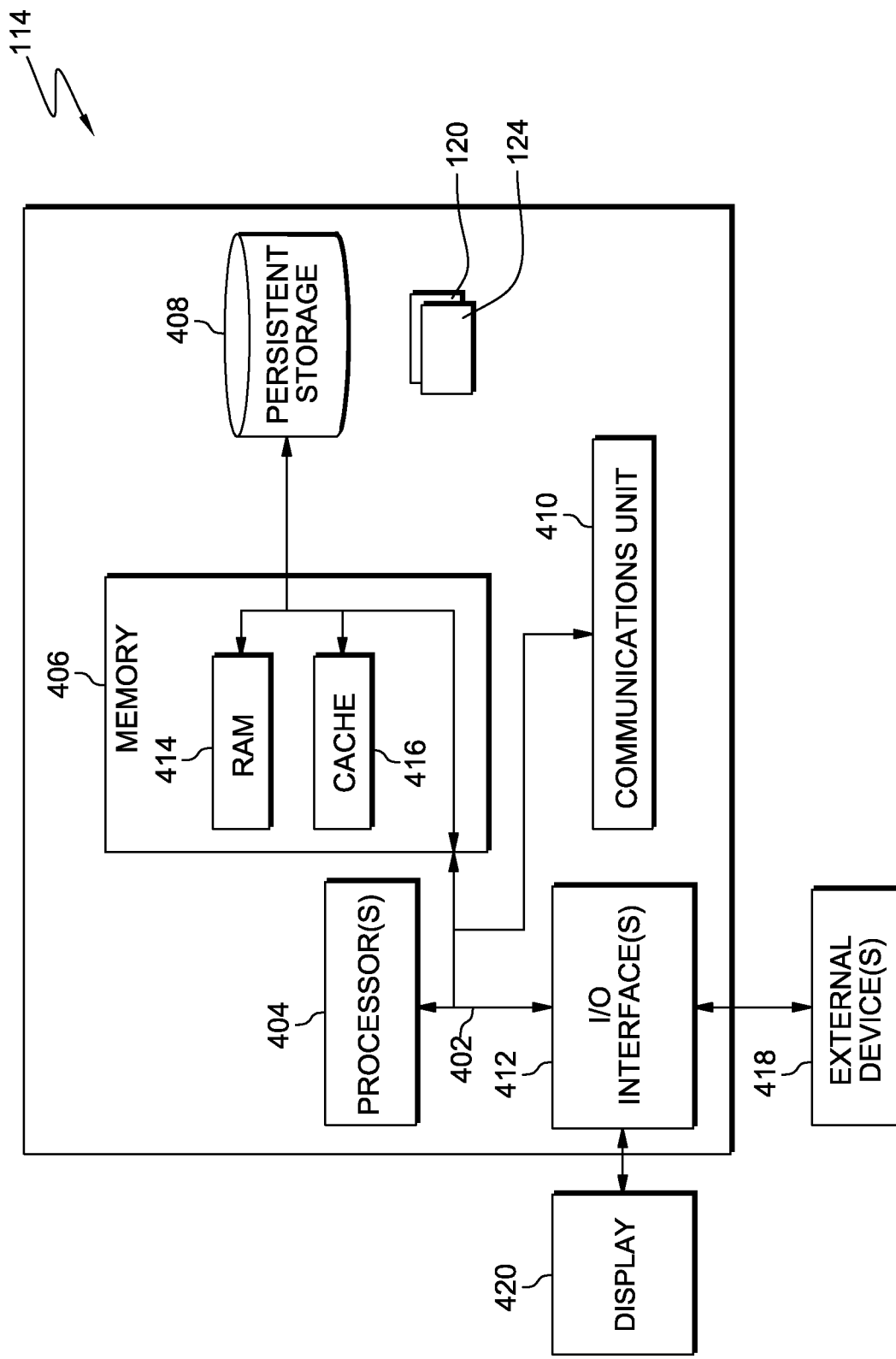
FIG. 4 depicts a block diagram of internal and external components of the edge caching server.

FIG. 4 depicts a block diagram of components of edge caching server 114 in accordance with an illustrative embodiment. It should be appreciated that FIG. 4 provides only an illustration of one implementation and does not imply any limitations with regard to the environment in which different embodiments may be implemented. Many modifications to the depicted environment may be made.

Edge caching server 114 includes communications fabric 402, which provides communications between computer processor(s) 404, memory 406, persistent storage 408, communications unit 410, and input/output (I/O) interface(s) 412.

Memory 406 and persistent storage 408 are examples of computer-readable tangible storage devices and media. Memory 406 may be, for example, one or more random access memories (RAM) 414, cache memory 416, or any other suitable volatile or non-volatile storage device.

HTTP header analyzer program 120 and pre-fetch agent 124 are stored in persistent storage 408 for execution by one or more of the respective computer processors 404 via one or more memories of memory 406. In the embodiment illustrated in FIG. 4, persistent storage 408 includes flash memory. Alternatively, or in addition to flash memory, persistent storage 408 may include a magnetic disk storage device of an internal hard drive, a solid state drive, a semiconductor storage device, read-only memory (ROM), EPROM, or any other computer-readable tangible storage device that is capable of storing program instructions or digital information.

The media used by persistent storage 408 may also be removable. For example, a removable hard drive may be used for persistent storage 408. Other examples include an optical or magnetic disk that is inserted into a drive for transfer onto another storage device that is also a part of persistent storage 408, or other removable storage devices such as a thumb drive or smart card.

Communications unit 410, in these examples, provides for communications with other computers and devices. In these examples, communications unit 410 includes one or more network interface cards. Communications unit 410 may provide communications through the use of either or both physical and wireless communications links. HTTP header analyzer program 120 and pre-fetch agent 124 may be downloaded to persistent storage 408 through communications unit 410.

I/O interface(s) 412 allows for input and output of data with other devices that may be connected to edge caching server 114. For example, I/O interface 412 may provide a connection to external devices 418 such as a keyboard, keypad, a touch screen, and/or some other suitable input device. I/O interface(s) 412 may also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for pre-fetching content, the method comprising:
  identifying at least one resource, through an examination of one or more HTTP server logs, that is cached on at least one of a plurality of client computers and has been validated by a server computer;
  determining to pre-fetch the at least one resource based on one or more predefined rules, at least one of the predefined rules including a threshold number of responses validating the at least one resource;
  pre-fetching the at least one resource from the server computer;
  caching the at least one resource locally;
  receiving a request for the at least one resource from a client computer, of the plurality of client computers, that does not have the at least one resource cached on the client computer;
  sending the at least one resource to the client computer from the local cache; and
  prior to said caching the at least one resource locally:
    responsive to determining that an HTTP header includes a cache-control directive that dictates that the at least one resource should not be cached, setting a flag associated with the at least one resource to indicate that the at least one resource is locally cacheable.

2. The method of claim 1, wherein:
  determining that the HTTP header that dictates that the at least one resource should not be cached comprises determining that the HTTP header is a "private" cache-control directive.

3. The method of claim 1, further comprising:
  prior to said sending the at least one resource to the client computer from the local cache:
    determining that the at least one resource cached locally is not cacheable absent a rule or policy overriding an HTTP caching directive; and
    validating the at least one resource.

4. The method of claim 1, wherein the one or more predefined rules further comprise one or more of:
  a threshold number of client computers that have cached the at least one resource;
  a threshold number of client computers that have requested validation of the at least one resource;
  a threshold number of validation requests received; and
  a threshold size of the at least one resource.

5. The method of claim 3, wherein said validating the at least one resource comprises:
  sending a conditional request to the server computer such that if the at least one resource on the server computer has been modified, the server computer sends a current version of the at least one resource, and if the at least one resource has not been modified, the server computer sends a response indicating that the at least one resource is current.

6. The method of claim 1, wherein the at least one resource is a video.

7. The method of claim 1, wherein said identifying the at least one resource comprises:
  searching the one or more HTTP server logs for "if-modified-since" request headers and "not-modified" response headers.

8. The method of claim 1, further comprising querying at least one peer caching computer in a hierarchical caching network for at least one of the one or more HTTP server logs.

* * * * *